J. P. SIMPSON.
PISTON PACKING.
APPLICATION FILED SEPT. 20, 1921.
1,417,355.
Patented May 23, 1922.
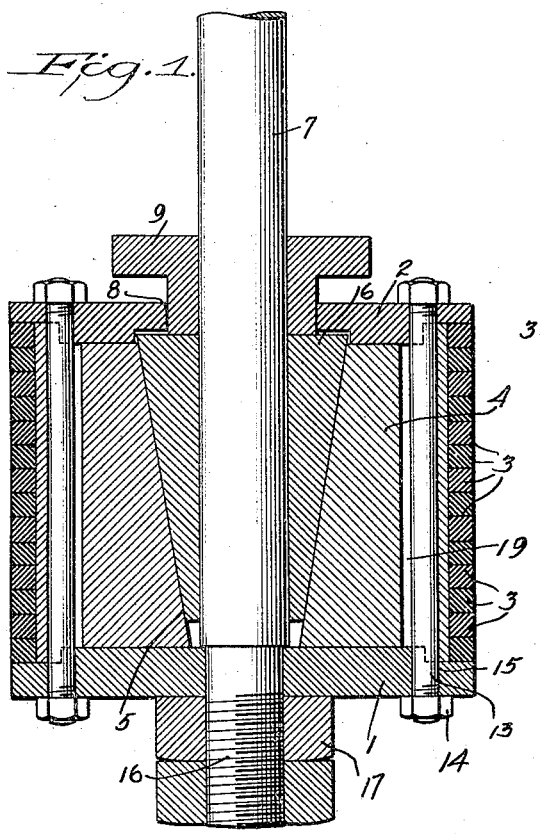
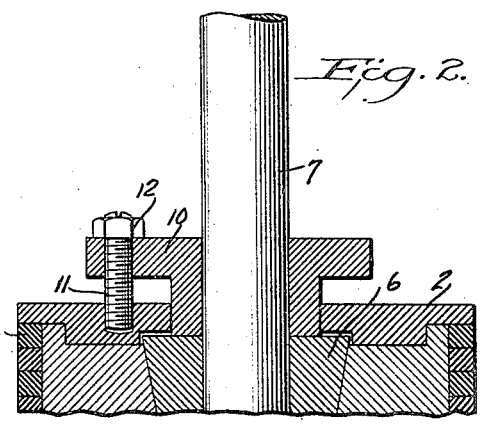
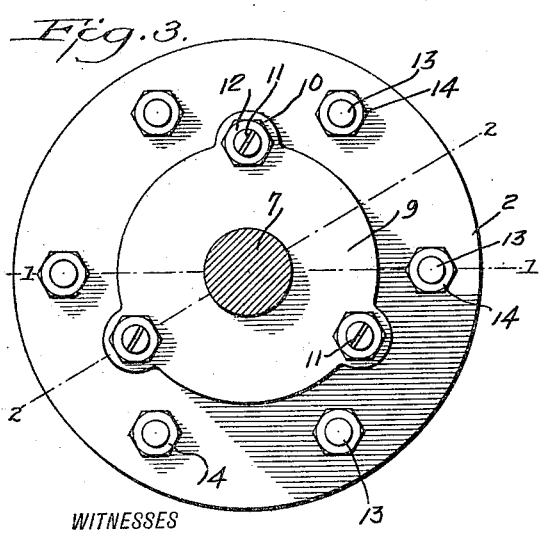
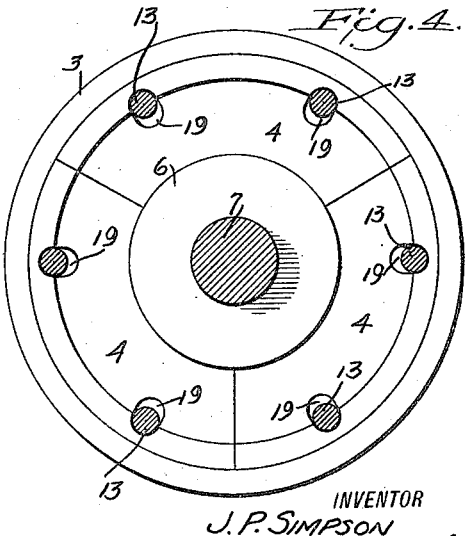
WITNESSES
INVENTOR
J. P. SIMPSON
BY
ATTORNEYS

UNITED STATES PATENT OFFICE.

JAMES P. SIMPSON, OF NEW YORK, N. Y.

PISTON PACKING.

1,417,355.  Specification of Letters Patent.  Patented May 23, 1922.

Application filed September 20, 1921. Serial No. 501,888.

*To all whom it may concern:*

Be it known that I, JAMES P. SIMPSON, a citizen of the United States, and a resident of the city of New York, borough of Manhattan, in the county and State of New York, have invented a new and Improved Piston Packing, of which the following is a full, clear, and exact description.

This invention relates to a packing for pistons and similar devices, and has for an object the provision of a simple, strong, easily operated mechanism whereby the packing in the piston may be adjusted to continually tightly fit within the cylinder wall without replacing the packing.

Another object resides in the particular construction and arrangement of parts which are hereinafter described and claimed and shown in the accompanying drawings.

The invention is illustrated in the drawings, of which—

Figure 1 is a vertical section through the piston taken on the line 1—1 of Figure 3;

Figure 2 is a similar section taken on the line 2—2 of Figure 3;

Figure 3 is a plan view;

Figure 4 is a plan view of the piston with the upper cover plate removed; and

Figure 5 is a view of the tapered plug, the movement of which causes the adjustment of the packing.

The invention as illustrated in the drawings is a preferred form of my device, although it should be understood that various modifications in the mechanical construction and arrangement and the character of the materials used may be varied while still retaining the same operative principle which it is my desire to cover in this application.

This invention is applicable to any style of piston but is shown preferably applied to a piston having front and rear head plates 1 and 2, between the peripheral edges of which a plurality of piston packing rings 3 are disposed. Within the space enclosed by the packing rings 3, and disposed between the plates 1 and 2, are a plurality of split sections 4 forming a solid body portion. These sections are somewhat annular in shape and are provided with inner tapered walls 5 with which a tapered frusto-conical plug 6 is adapted to co-operate. This plug is provided with a central bore through which a piston rod 7 extends. An aperture 8 is provided in the plate 2 and receives a flanged plate 9 which bears against the upper face of the plug 6. This plate 9 is provided with a plurality of angularly disposed ear portions 10 having suitable apertures therein through which bolts 11 extend which are adjusted by means of nuts 12. Each bolt 11 extends into suitable apertures or recesses in the plate 2.

A plurality of bolts 13 extend between the plates 1 and 2 and are provided with adjusting or tightening nuts 14 at each end. Apertures 15 are formed in the plates 1 and 2 to permit of the passage of said bolts. The end of the piston 7 is threaded, as at 16, to receive tightening nuts 17 and 18. The split sections 4 are provided with apertures or bores 19 to permit the passage of the bolts 13, and these apertures or bores are considerably larger than the cross section of the bolts 13 to permit the sections 4 to have a certain amount of movement relative to the bolts 13.

In the operation of the device, the parts are assembled as shown in Fig. 1. If the packing rings 3 become worn so that leakage occurs in the cylinder past the piston, to eliminate this condition and tighten the packing ring 3, it is merely necessary to loosen the bolts 13 slightly, then tighten the nuts 12, which forces the plate 9 downward against the tapered plug 6. The downward movement of the plug 6 causes the sections 4 to be moved outwardly uniformly. This movement of the sections 4 forces the piston ring 3 outwardly and causes a tight contact between the piston rings and the walls of the cylinder. When the rings have been expanded sufficiently, the nuts 14 are then tightened up on the bolts 13, which clamps the plates 1 and 2 against the sections 4 and the rings 3, whereupon the device is ready for operation again.

What I claim is:

1. A packing construction for pistons, which comprises a plurality of annular split sections forming a piston body portion, said sections having tapered inner walls, a pair of plates disposed against the upper and lower faces of the sections, means for clamping said plates on to said sections, a plurality of packing rings disposed around said sections and between said plates, a tapered plug disposed within said sections, a flanged plate bearing on said plug, and adjustable means connecting said flanged plate with one of said previously mentioned plates to adjust the position of the plug, whereby the split sections can be expanded or contracted to determine the position of the packing rings.

2. A piston construction which comprises a piston rod, a pair of plates disposed therealong, a plurality of split annular body sections disposed between said plates, said sections having a plurality of enlarged bores therein, a plurality of bolts extending through said bores and having a diameter somewhat smaller than the bores to permit of movement of the sections relative to the plates, nuts on the bolts adapted to clamp the plates against the sections, a plurality of packing rings disposed around said sections, a flange on said plates adapted to bear against the upper and lower packing rings and clamp them in place, said sections having a tapered inner wall, a tapered plug disposed within the sections along the piston rod, a flanged collar bearing against the plug, an adjustable connection between the flanged collar and one of said plates whereby the collar may be moved to move the plug and thereby vary the position of the split sections to determine the disposition of the packing rings.

JAMES P. SIMPSON.